Aug. 28, 1945.  R. P. HANNA  2,383,721
TROLLEY CONDUCTOR DEVICE
Filed March 13, 1943
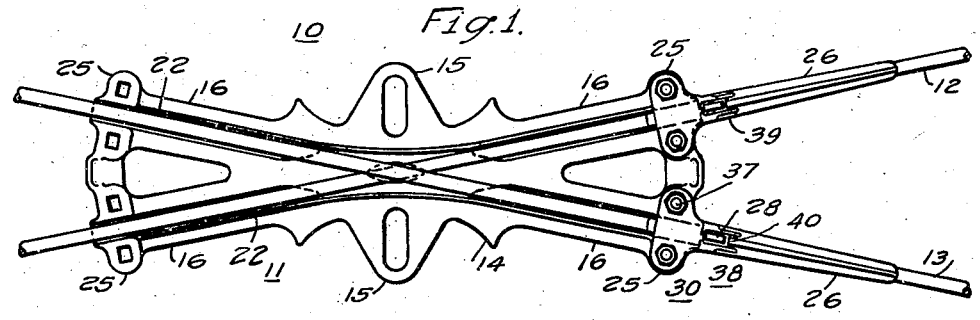
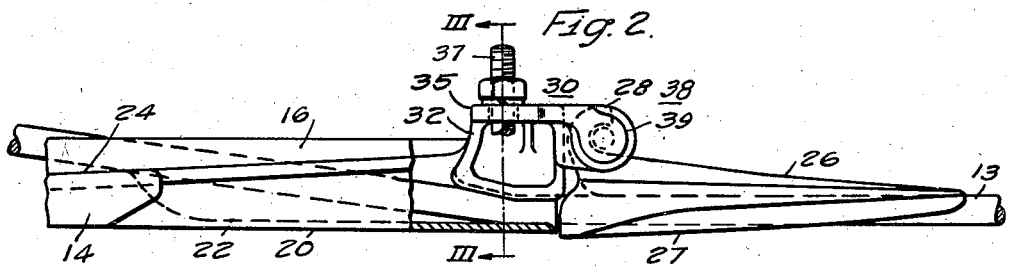
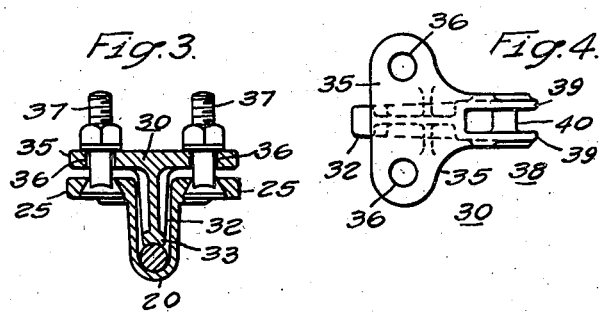
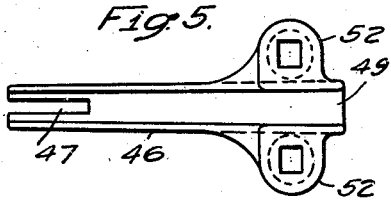
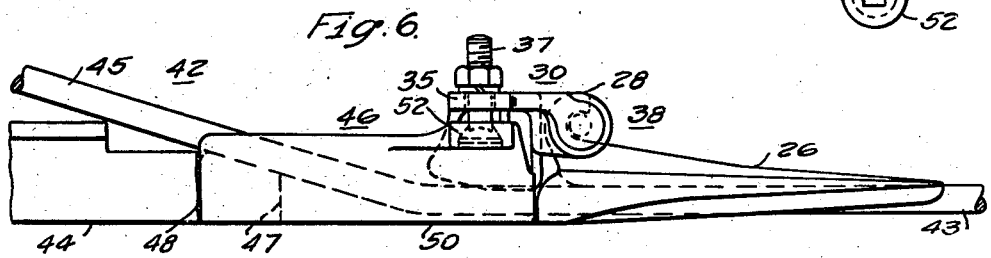
WITNESSES:
E. A. M'Closkey
G. V. Giolma
INVENTOR
Raymond P. Hanna
ATTORNEY Patented Aug. 28, 1945

2,383,721

UNITED STATES PATENT OFFICE 2,383,721

TROLLEY CONDUCTOR DEVICE

Raymond P. Hanna, Pittsburgh, Pa., assignor to Westinghouse Electric Corporation, East Pittsburgh, Pa., a corporation of Pennsylvania Application March 13, 1943, Serial No. 479,041

10 Claims. (Cl. 191—43)

My invention relates generally to trolley conductor devices, and it has reference in particular to means for securing trolley conductors and approach members in predetermined relation to trolley conductor devices.

Generally stated, it is an object of my invention to provide for detachably securing approach members to trolley conductor devices in a manner which is simple and inexpensive.

More specifically, it is an object of my invention to provide for depressing a trolley conductor into predetermined alignment with a trolley conductor device and provide for detachably securing a removable approach member to the device.

It is an important object of the invention to provide for detachably securing a renewable approach member to a trolley conductor device so that the approach member may be renewed without releasing the trolley conductor from a predetermined operating relation with the device.

Another object of my invention is to provide an adjustable attachment for trolley conductor devices having channeled end portions for receiving a trolley conductor, whereby different sizes of trolley conductors may be retained in a predetermined position in the channeled portion and means may be provided for detachably connecting an approach member to the device without altering the position of the trolley conductors.

Yet another object of my invention is to make it easier to detach worn approach members from trolley conductor devices and replace them with new ones.

Other objects will in part be obvious, and will in part be hereinafter explained.

In accordance with my invention, a trolley conductor is retained in a channeled end portion of a trolley conductor device by a dependent tongue on an adapter adjustably secured to the device. A clevis is provided on the adapter for engaging a hook on a renewable approach member, whereby the approach member may be detachably secured to the device without effecting the position of the trolley conductor relative to the device.

For a more complete understanding of the nature and scope of my invention, reference may be made to the following detailed description, which may be read in connection with the accompanying drawing, in which:

Figure 1 is a partial plan view of a portion of a trolley conductor system using a trolley conductor device embodying the invention in one of its forms;

Fig. 2 is an enlarged partial side elevational view of the trolley conductor device shown in Fig. 1;

Fig. 3 is a sectional view taken along the line III—III of Fig. 2;

Fig. 4 is an enlarged plan view of the adapter shown in Figs. 1 and 2;

Fig. 6 is an enlarged side elevational view of another type of trolley conductor device embodying the principal features of the invention; and Fig. 5 is an enlarged plan view of the end portion of the trolley conductor device shown in Fig. 6.

Referring to Fig. 1, the reference numeral 10 may denote generally a portion of an overhead trolley conductor system wherein any one of a number of different trolley conductor devices may be used, such as, for example, the metallic crossing 11 which is used in connection with a pair of intersecting trolley conductors 12 and 13 to provide a relatively smooth path for a current collector (not shown) traversing either of the conductors.

Referring to Figs. 1 and 2, it may be seen that the crossing 11 may comprise generally a metallic plate 14 having ears 15 on opposite sides for the attachment of support means, and angularly related arms 16 at opposite ends provided with runner portions 20 on the lower sides for guiding a current collector. The arms 16 may be provided with grooves 22 adjacent the ends of the arms on the upper sides for receiving the trolley conductors, which may be disposed to cross one another at an elevated intermediate portion 24 of the plate 14. Laterally projecting flanges 25 may be provided adjacent the ends of the arms 16.

Approach members 26 having depending lips 27 disposed to be peened or otherwise bent about the trolley wires, may be provided adjacent the ends of the arms 16 to provide a relatively smooth transfer of a current collector from the trolley conductor to the runner portion 20. Retaining or securing means in the form of upwardly projecting hook portions 28 may be provided on the upper sides of the approach members 26 for securing them in operating relation to the trolley conductor device 11.

In order to depress the conductor 13 in the groove 22 of the channeled or U-shaped runner portion 20, means such as the adapter 30 may be provided. Referring to Figs. 1 through 4, it will be seen that the adapter 30 may comprise a dependent tongue portion 32 having a grooved trolley conductor seat 33 along the lower edge. A relatively horizontal transverse flange 35 may be provided on the tongue 32 having openings 36 for receiving means such as the bolts 37 which may pass through the flanges 25, whereby the adapter may be adjustably secured to the trolley conductor device 11 and the tongue 32 forced downwardly into the groove 22 different predetermined distances to depress different sizes of trolley conductors 13 into the proper alignment wtih the runner member 20. Since the adapter does not engage the current collector or conduct current, it may be made of relatively inexpensive, non-critical materials such as malleable iron or the like.

In order to provide for detachably securing the approach member 26 to the trolley conductor device 11 so that it may be readily detached when worn, retaining means 38 may be provided on the adapter 30 to cooperate with the securing means 28 of the approach member. For example, a pair of projecting spaced apart ears 39 may be provided on the adapter having transverse holding means 40 extending therebetween for engaging the hooked securing means 28 of the approach member. The holding means 40 may comprise removable pin, bolt or the like or may, as shown, be formed integrally with the ears 39 so as to provide a clevis.

When the trolley conductor device 11 is installed, the plate 14 may be readily attached to the trolley conductors by holding the plate against the conductors and loosely securing the adapters 30 to the device by means of bolts 37 passing through the flanges 25 and 35. As soon as the nuts on the bolts 37 are tightened, the trolley conductors are forced downwardly into the trolley conductor groove 22, thus positioning the conductors in the desired relation to the runner members 20. Different sizes of trolley conductors may easily be accommodated by adjusting the nuts on the bolts 37. In all instances the vertical distance from the top of the conductor to the transverse holding means 40 is the same, so that the approach is properly located relative to the conductor. The approach members 26 may then be readily attached by positioning the hooks 28 about the transverse holding means 40 with the approach members substantially vertical to the trolley conductors. The approach members may then be rotated about the holding means 40 so as to position the lips 27 about the trolley conductors, whereupon the lips may be peened or otherwise bent about the conductors to secure the approach members in operating relation to the trolley conductor device.

When one or more of the approach members becomes worn, they may be easily removed and replaced with new ones without changing the position of the trolley conductors relative to the runner members. The approach members may be simply pried loose from the conductors and rotated upwardly sufficiently to free the hooks 28 from the holding means 40. New approach members may then be installed and secured to the trolley conductor. By using an adapter embodying my invention, only a minimum of metal need be used for the approach which is usually of bronze or some other copper alloy.

Referring to Figs. 5 and 6, the reference numeral 42 may denote generally another form of trolley conductor device such as, for example, a curved trolley conductor support or segment, wherein a current collector may be transferred from a trolley conductor 43 to a curved guide or runner member 44, and the conductor 43 raised to an elevated position 45 and either positioned along the runner member 44 out of the way of a current collector traversing the runner member, or pulled-off to the outer side of the curved runner member in order to support it in a predetermined curvature, in a manner that is well known in the art.

In order to provide for a smooth transfer of a current collector from the conductor 43 to the runner member 44, means such as the end member 46 may be provided. The end member 46 may, for example, comprise an elongated body member having a slot 47 at one end for receiving one end of the runner member 44, whereby connection may be effected thereto through means such as the weld 48. The end member 46 also may be provided with an upwardly inclined conductor groove 49 extending from the other end, wherein the conductor 43 may be positioned. A runner portion 50 may be provided on the lower side of the end member for guiding a current collector onto the curved runner member 44, and means such as the laterally projecting ears 52 may be provided adjacent the upper side.

In order to depress the trolley conductor 43 into the conductor groove 49, an adapter 30 similar to that described in connection with Figs. 1 through 4 may be detachably secured to the end member 46 by means of bolts 37 cooperative with the laterally projecting ears 52. A renewable approach member 26 may be detachably secured to the end member 46 by engagement of the hooked securing means 28 thereof with the retaining means 38 of the adapter, as hereinbefore described in connection with the trolley conductor device shown in Figs. 1 through 3.

From the above description and the accompanying drawing, it will be apparent that I have provided a simple and inexpensive method of detachably securing renewable approach members to trolley conductor devices of various kinds. By utilizing an adapter embodying the features of my invention, the trolley conductor may be easily secured in predetermined relation to the trolley conductor device. Renewable approach members may be easily attached to the trolley conductor device and detached therefrom when worn without freeing the trolley conductor from its normal operating position with respect to the device so that the usual relatively frequent renewals of the approach members may be easily made without requiring any skill on the part of the operator and in a minimum of time. Different sizes of conductors may be readily accommodated by lightening the nuts on the bolts 37 correspondingly different amounts. By using a single hook on the approach which is the renewable part and providing a cooperating clevis on the adapter which may be made of malleable iron or some other relatively non-critical material great savings in critical materials may be effected since the hook uses a minimum of material.

Since certain changes may be made in the above description, and different embodiments of the invention may be made without departing from the spirit or the scope thereof, it is intended that all the matter contained in the above description and shown in the accompanying drawing shall be considered as illustrative and not in a limiting sense.

I claim as my invention:

1. An adapter for securing an approach member to a trolley conductor device having a channel to receive a trolley conductor comprising, a tongue portion disposed to be positioned in the channel to secure different sizes of conductors therein, means integral with the tongue portion for attaching the adapter to the conductor device in different positions, and means on the adapter adjacent the tongue portion for effecting a detachable connection with an approach member in predetermined relation to the conductor.

2. An adapter for securing an approach member to a trolley conductor device having a groove for receiving the conductor comprising, a dependent tongue for engaging the conductor in the groove, transversely projecting securing means on the tongue for securing the tongue in different predetermined fixed relations to the channel, and a clevis integral therewith for effecting a detachable connection with an approach member so as to secure the approach member in predetermined relation to the conductor.

3. The combination in a trolley conductor system; of a trolley conductor device having a runner portion with a longitudinal groove to receive different sizes of conductor and a flange projecting to one side of the groove adjacent one end, an adapter adjustably secured to the device comprising a dependent tongue portion disposed to depress the conductor into the groove and having laterally projecting flange means integral with the tongue portion and cooperative with the flange of the runner portion to secure the tongue portion in the groove, said adapter being provided with a clevis integral with the tongue portion at the outer end, and an approach member having depending lips disposed to be formed about the conductor and upwardly projecting hook means cooperative with the clevis to secure the approach member to the adapter in predetermined relation to the conductor.

4. The combination with a trolley device having a runner portion with a groove to receive a trolley conductor, of an adapter disposed to be secured to the device having a dependent tongue to depress the conductor into the groove and a pair of spaced ears at the outer end with transverse holding means extending therebetween, and an approach member having depending lip portions disposed to be positioned about the conductor and an upwardly projecting hook open on the side remote from the adapter engaging the transverse holding means.

5. A trolley device comprising, a substantially U-shaped runner portion disposed to receive a trolley conductor, an adapter secured to the runner portion having a dependent tongue to position the conductor in the runner portion and a clevis integral therewith, and an approach member having a U-shaped groove on the lower side to receive the conductor and an upwardly projecting hook on the upper side cooperative with the clevis to secure the approach member in predetermined relation to the conductor.

6. The combination in a trolley conductor device, of an end portion having a groove on the upper side adjacent one end to receive different sizes of trolley conductor, an adapter comprising a transverse web having a dependent tongue disposed to position the conductor in the groove and transverse holding means adjacent the outer end for securing it to the end portion of the device, and an approach member disposed about the conductor adjacent the end portion having means cooperative with the transverse holding means to effect a detachable connection to the device in predetermined relation to the conductor.

7. An adapter for a trolley device comprising, a transverse flange having a dependent tongue and a clevis at one end.

8. An adapter for securing an approach member to a trolley conductor device comprising, a substantially horizontal retaining flange having openings for securing means whereby the adapter may be secured to the trolley device, a substantially central dependent conductor engaging web, and means at one end for effecting a detachable connection with an approach member.

9. The combination with a runner member in a trolley conductor system, of an end member secured at one end to the runner member and provided at the other end with a transverse flange and an upwardly inclined longitudinal groove for receiving a trolley conductor, an adapter having conductor retaining means with a flange cooperative with said transverse flange and a clevis integral therewith at one end, and an approach member disposed to be positioned on the conductor and provided with an open hook detachably engaging the clevis.

10. The combination with a trolley device, of an adapter having dependent conductor retaining means provided with transverse securing means for attaching it to the device and transverse holding means adjacent the end remote from the device, and an approach member disposed to be secured to the conductor having an upwardly projecting hook portion engaging the transverse holding means to detachably secure the approach member relative to the conductor.

RAYMOND P. HANNA.